US011831718B2

United States Patent
Nakaya

(10) Patent No.: US 11,831,718 B2
(45) Date of Patent: Nov. 28, 2023

(54) IN-VEHICLE EQUIPMENT CONTROLLER AND VEHICLE CONTROL SYSTEM

(71) Applicant: Mazda Motor Corporation, Hiroshima (JP)

(72) Inventor: Yusuke Nakaya, Aki-gun (JP)

(73) Assignee: MAZDA MOTOR CORPORATION, Hiroshima (JP)

(*) Notice: Subject to any disclaimer, the term of this patent is extended or adjusted under 35 U.S.C. 154(b) by 313 days.

(21) Appl. No.: 17/160,385

(22) Filed: Jan. 28, 2021

(65) Prior Publication Data
US 2021/0273997 A1  Sep. 2, 2021

(30) Foreign Application Priority Data
Feb. 27, 2020  (JP) .................. 2020-032209

(51) Int. Cl.
H04L 29/08  (2006.01)
H04L 67/12  (2022.01)
H04L 12/40  (2006.01)
H04L 67/04  (2022.01)
G05B 13/00  (2006.01)

(52) U.S. Cl.
CPC ............. *H04L 67/12* (2013.01); *G05B 13/00* (2013.01); *H04L 12/40* (2013.01); *H04L 67/04* (2013.01); *H04L 2012/40273* (2013.01)

(58) Field of Classification Search
CPC ......... H04L 67/12; H04L 12/40; H04L 67/04; H04L 2012/40273; G05B 13/00; G06F 9/545; B60W 50/00; B60W 10/04; B60W 10/18; B60W 10/20; B60W 40/02; B60W 40/08; B60W 40/105; B60W 40/107; B60W 40/109; B60W 60/00; B60W 2050/0002; B60W 2420/42; B60W 2420/52
See application file for complete search history.

(56) References Cited

U.S. PATENT DOCUMENTS

| 6,741,639 | B1* | 5/2004 | Yoshida | ............... H04B 1/0003 375/220 |
| 2019/0163288 | A1* | 5/2019 | You | ........................ G06F 3/0362 |
| 2021/0268973 | A1* | 9/2021 | Nakaya | ................. B60R 16/037 |

FOREIGN PATENT DOCUMENTS

JP  2017-105362 A  6/2017

* cited by examiner

*Primary Examiner* — Kim T Nguyen
(74) *Attorney, Agent, or Firm* — XSENSUS LLP

(57) ABSTRACT

The present disclosure relates to reducing software development man-hours when vehicle models are developed. In an in-vehicle equipment controller, a control section has, as a software configuration: an application layer in which an application for in-vehicle equipment is implemented; a device driver; and a middleware layer in which a communication path is generated between the application and the device driver. The middleware layer includes a physical quantity conversion module that converts physical quantity data according to a specified conversion rule, the physical quantity data being included in data transferred through the communication path.

18 Claims, 6 Drawing Sheets

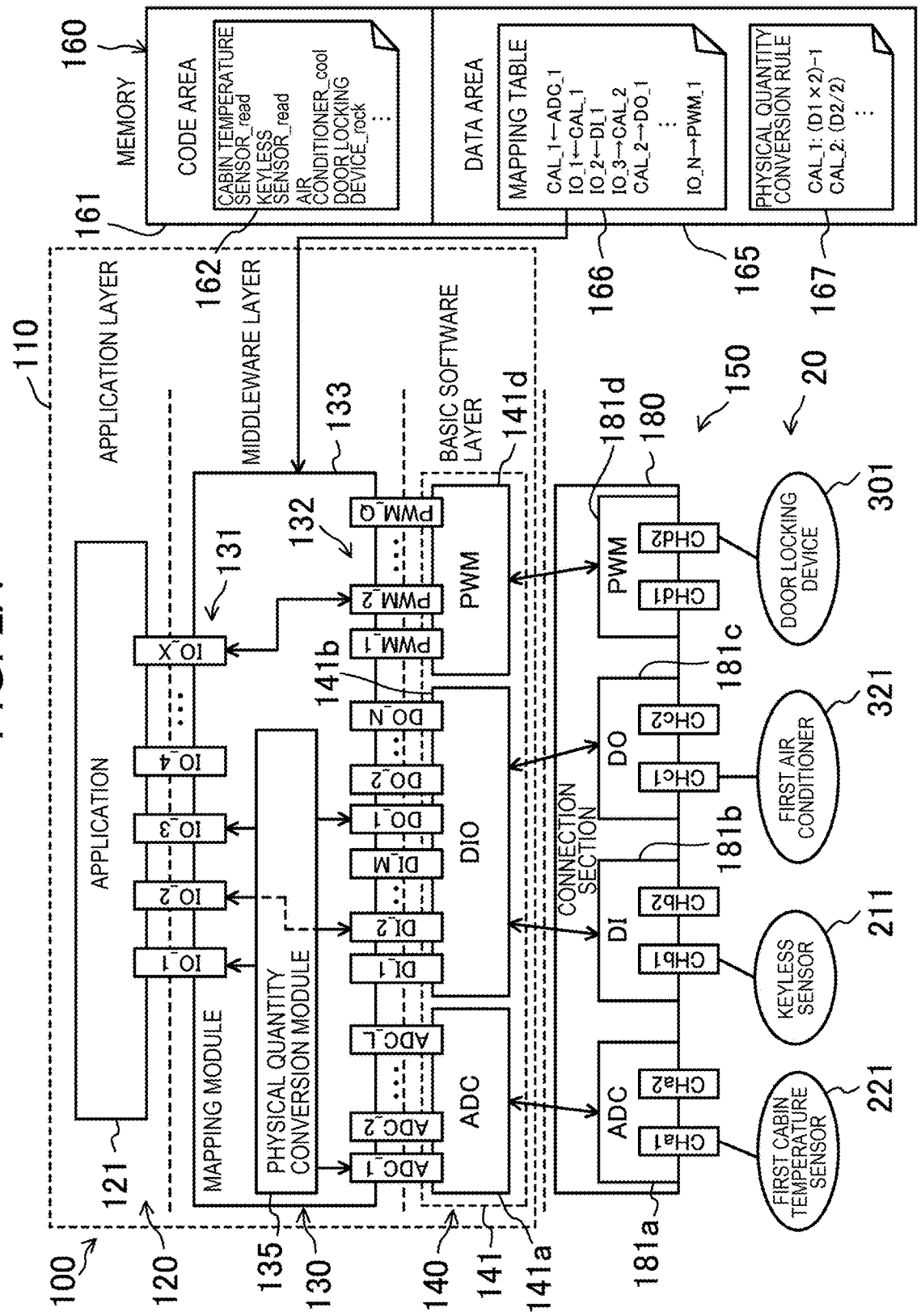

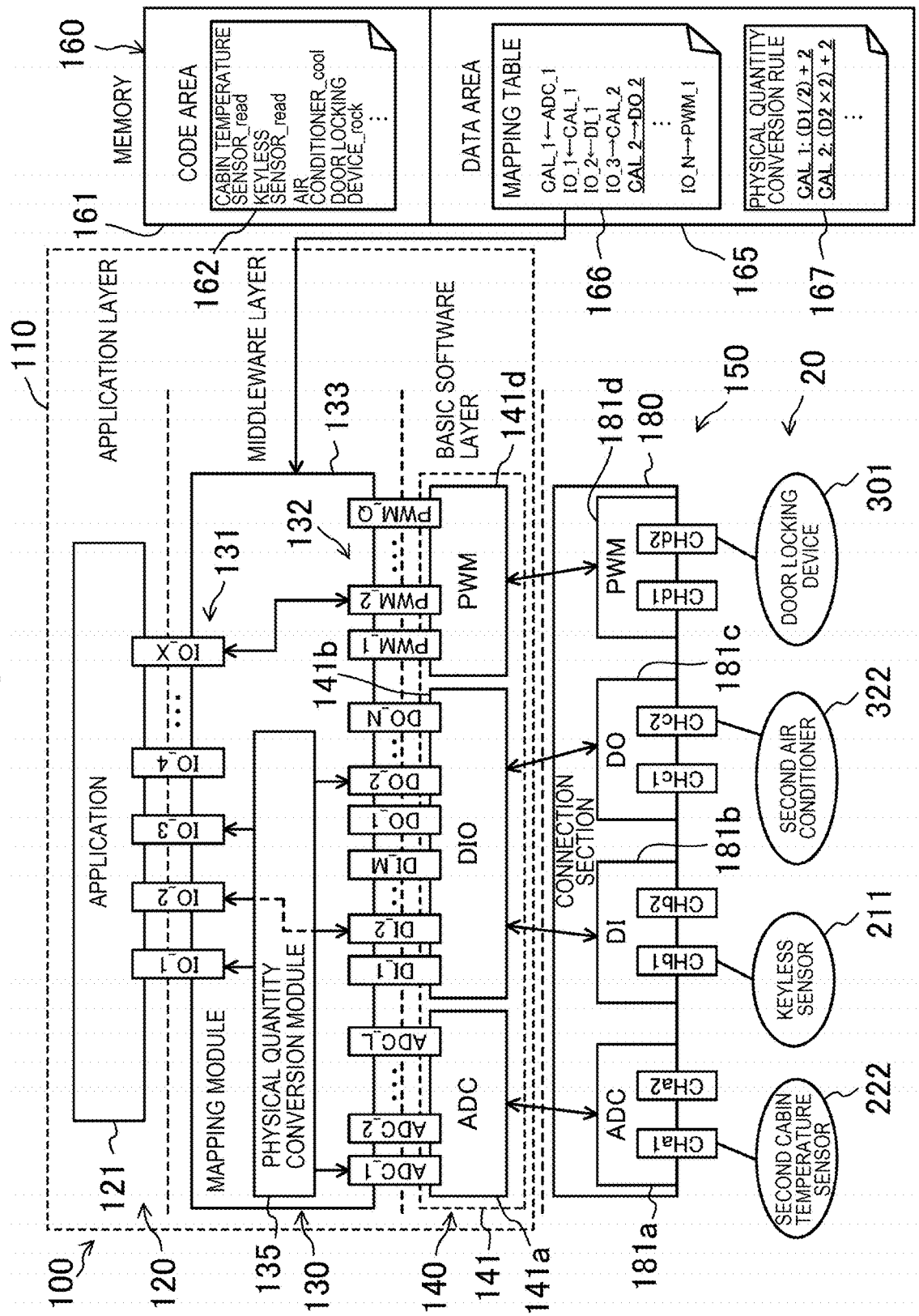

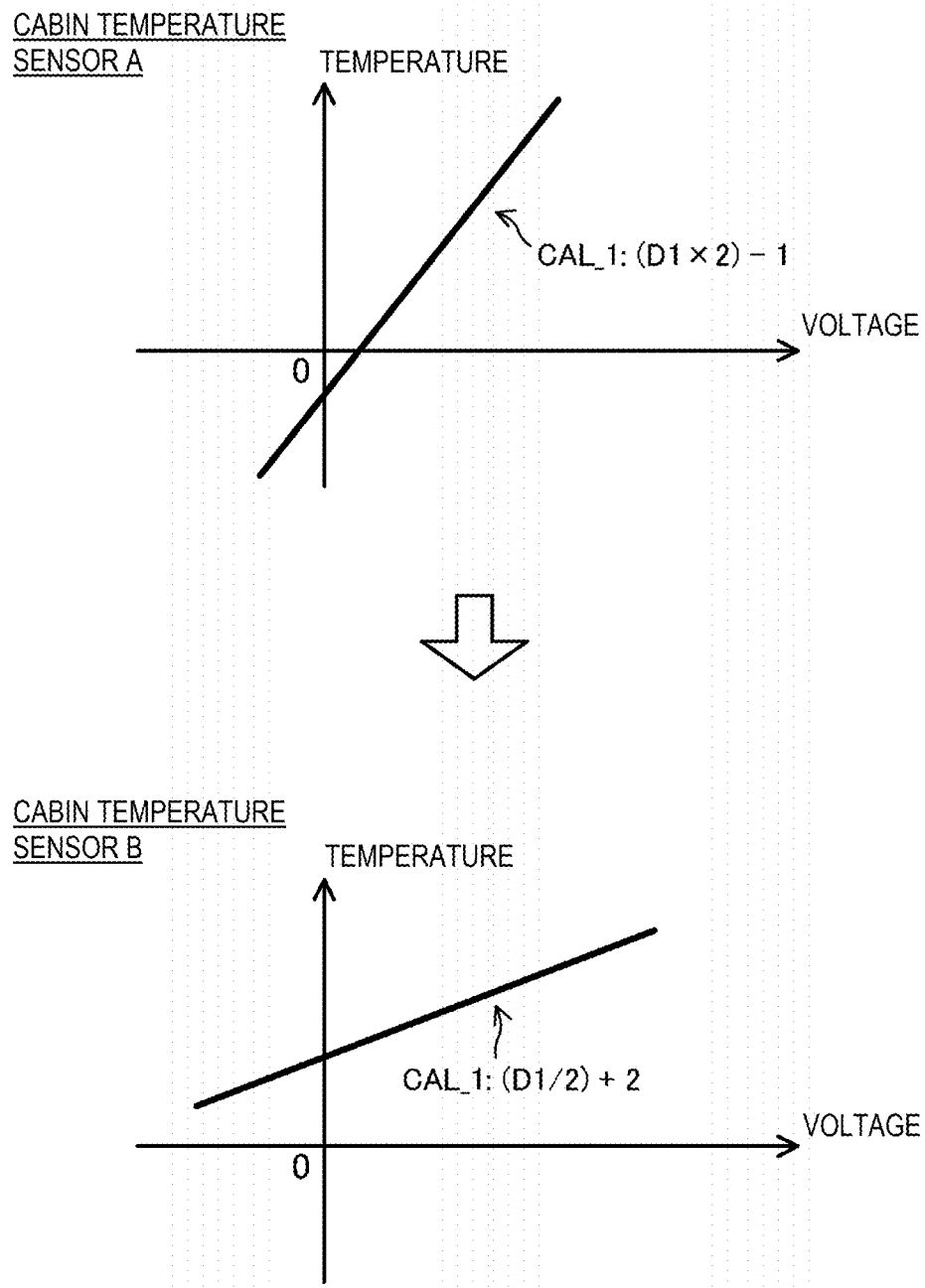

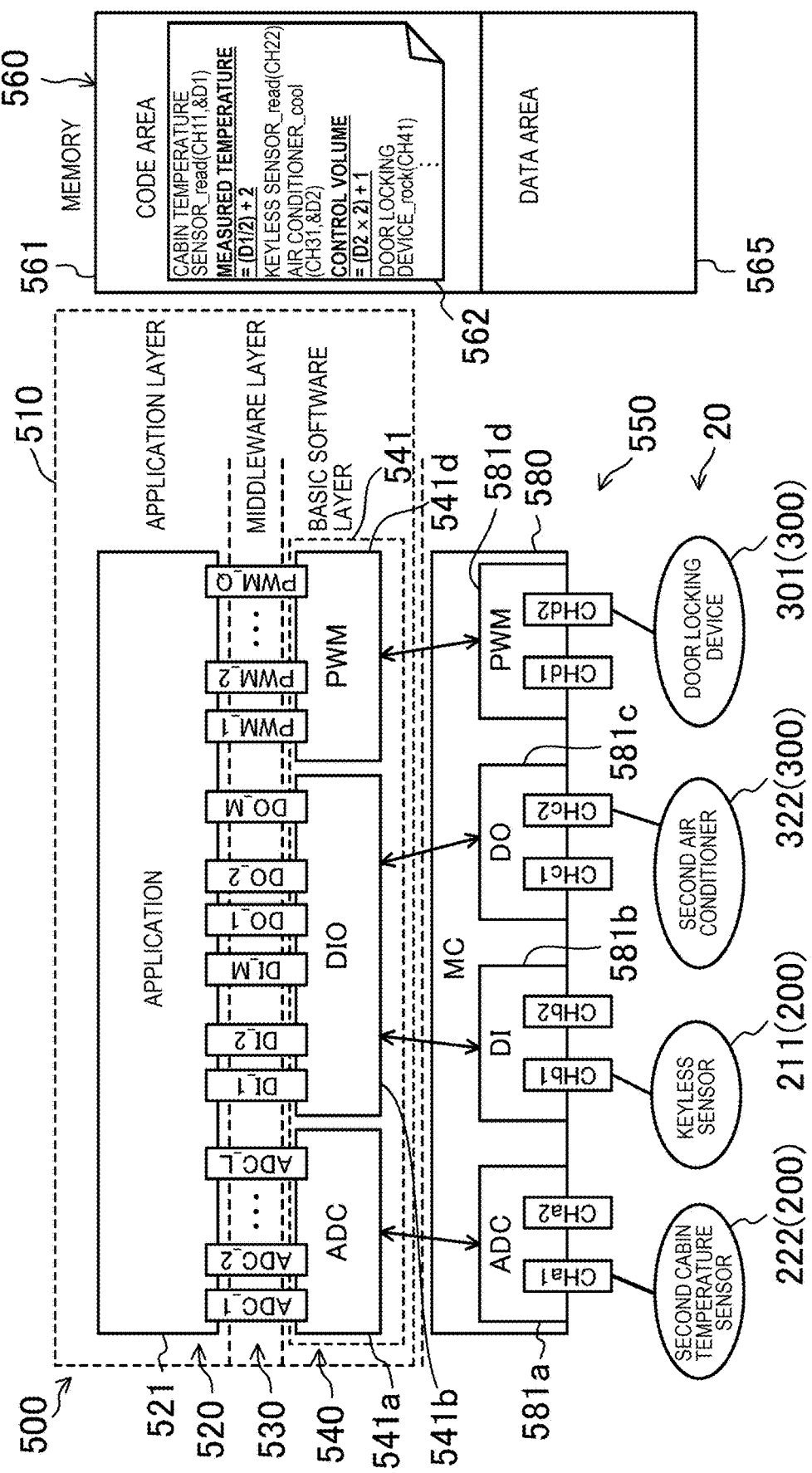

… (1)

IN-VEHICLE EQUIPMENT CONTROLLER AND VEHICLE CONTROL SYSTEM

CROSS-REFERENCE TO RELATED APPLICATION

This application claims priority from Japanese Application No. 2020-032209, filed on Feb. 27, 2020, the contents of which are incorporated by reference herein in its entirety.

TECHNICAL FIELD

A technique disclosed herein belongs to a technical field related to an in-vehicle equipment controller and a vehicle control system.

BACKGROUND

In recent years, development of automated driving systems has been promoted nationally, and almost all actuators provided in vehicles are subjected to electronic control. Controllers that control these actuators often have a software structure that complies with standards of Automotive Open System Architecture (AUTOSAR).

For example, a control system that has a software structure based on the standards of AUTOSAR is disclosed in Patent document 1. In the control system, information on a sender, a recipient, and a data type is included in advance in communication data. Then, in an application layer, a communication interface service that is selected according to the data type and a hierarchy of one of the sender and the recipient recognized by the other thereof is applied to the communication data.

PATENT DOCUMENTS

[Patent document 1] JP-A-2017-105362

SUMMARY

Problem to be Solved

By the way, in a hierarchical software architecture such as AUTOSAR, an application invokes an application programming interface (API) that is provided by a device driver per peripheral, and exchanges I/O.

For example, there is a case where in-vehicle equipment that is connected to the I/O is changed, which consequently changes a signal change characteristic with respect to a change in an acquired physical quantity. In such a case, the application code has to be rewritten for processing to convert the physical quantity. In such a case, an application program has to be compiled again to replace data in memory, which increases software development man-hours and verification man-hours.

A technique disclosed herein has been made in view of such a point and therefore has a purpose of reducing software development man-hours.

In order to solve the above problem, the technique disclosed herein provides an in-vehicle equipment controller including a control section that controls in-vehicle equipment and a storage section. The control section has, as a software configuration: an application layer in which an application implementing functions for the in-vehicle equipment is installed; a device driver that converts a command received from the application into a hardware command; and a middleware layer in which a communication path is generated between the application and the device driver. The middleware layer includes a physical quantity conversion module that converts physical quantity data according to a specified conversion rule, and the physical quantity data is included in data transferred through the communication path.

According to this aspect, even in the case where a characteristic of the in-vehicle equipment that is connected to the in-vehicle equipment controller is changed due to a change of the in-vehicle equipment or the like, the characteristic change can be handled simply by rewriting the conversion rule of the physical quantity conversion module without modifying a program code in the application. In this way, it is possible to significantly reduce software development man-hours when a vehicle model is changed or when vehicle models are developed.

In addition, the technique disclosed herein provides a vehicle control system including: a plurality of zone ECUs, each of which is arranged per specified zone in a vehicle; and a central processing unit that controls the plurality of the zone ECUs. The one or the plurality of the zone ECUs include the in-vehicle equipment controller in the above aspect.

In the case where the plurality of the zone ECUs are provided in the vehicle and managed by the central processing unit, the in-vehicle equipment is connected to the zone ECU. At this time, there is a case where the in-vehicle equipment is changed. However, with the configuration in this aspect, it is possible to significantly reduce the software development man-hours for both of the central processing unit and the zone ECUs.

The disclosure describes various advantages including, according to the technique disclosed herein, it is possible to significantly reduce the software development man-hours when vehicle models are developed.

BRIEF DESCRIPTION OF THE DRAWINGS

FIG. 2A is a block diagram illustrating a configuration example of an in-vehicle equipment controller according to an embodiment.

FIG. 2B is a block diagram illustrating a configuration example of the in-vehicle equipment controller according to the embodiment.

FIG. 3 includes graphs for illustrating a physical quantity conversion rule.

FIG. 4B is a block diagram illustrating a configuration example of the in-vehicle equipment controller according to the comparative example.

DETAILED DESCRIPTION

A detailed description will hereinafter be made on an exemplary embodiment with reference to the drawings.

(Vehicle Control System)

Figure 1:
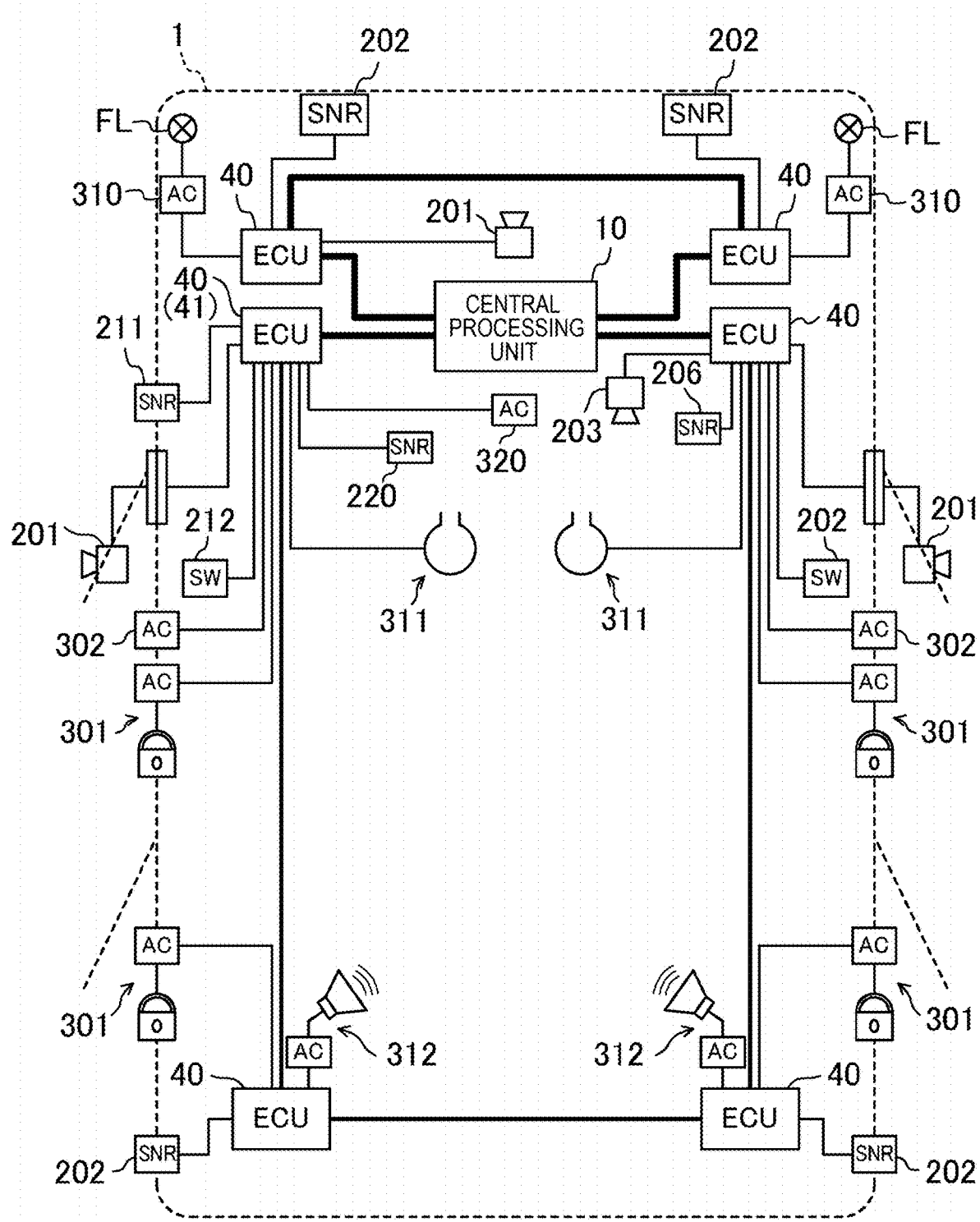
FIG. 1 is a view illustrating a configuration example of a vehicle control system.

FIG. 1 is a view illustrating a configuration example of a vehicle control system. The vehicle control system illustrated in FIG. 1 is mounted on a vehicle 1, and includes: plural zone ECUs 40, each of which is arranged per specified zone in the vehicle 1; and a central processing unit 10 that controls the plural zone ECUs 40. In the vehicle control system of this embodiment, an example in which the vehicle 1 is divided into six zones and the zone ECU 40 is provided in each of the zones will be described. The zone ECU 40 is configured that in-vehicle equipment can be connected thereto. In addition, the zone ECU 40 has a function as a network hub device that relays information transferred via an in-vehicle network. For convenience of the description, the zone ECU 40 that is arranged in a front left zone on a front left side of the vehicle 1 may be referred to as a first zone ECU 41.

<In-Vehicle Equipment>

In-vehicle equipment 20 includes: input equipment including a sensor device 200 and a signal reception device; and an actuator 300.

<<Sensor Device, Signal Reception Device>>

Examples of the sensor device 200 include: (1) plural cameras 201 that are provided to a body or the like of the vehicle 1 to capture images of external environment; (2) plural radars 202 that are provided to the body or the like of the vehicle 1 to detect an external object and the like; (3) a position sensor (not illustrated) that detects a position of the vehicle 1 (vehicle position information) by using the Global Positioning System (GPS); (4) a vehicle state sensor (not illustrated) that is constructed of a sensor group including a vehicle speed sensor, an acceleration sensor, and a yaw rate sensor for detecting behavior of the vehicle and acquires a state of the vehicle 1 from output of the sensor group; (5) an occupant state sensor that includes an in-vehicle camera 203 and the like to acquire a state of an occupant in the vehicle 1; (6) a driving operation sensor 206 that detects a driving operation by a driver; (7) a sensor 211 that actuates a keyless device (hereinafter referred to as a keyless sensor 211); and (8) a cabin temperature sensor 220 that measures a temperature inside a cabin. Examples of the driving operation sensor 206 include an accelerator pedal position sensor, a steering angle sensor, and a brake hydraulic pressure sensor. The sensor device 200 also includes a switch that detects an operation by the occupant. Examples of the switch include a PW switch 212 that is used by the occupant to operate an electric power window, a washer fluid level switch, and a hood switch.

An example of the signal reception device can be a receiver that receives signals from an external network and another vehicle.

<<Actuator>>

The actuators 300 include an actuator for a drive system, an actuator for a steering system, an actuator for a brake system, and the like. Examples of the actuator for the drive system include an engine, a transmission, and a motor. An example of the actuator for the brake system is a brake. An example of the actuator for the steering system is a steering wheel. In addition, examples of the actuator 300 include a door locking device 301 that locks a side door, an electric power window device 302, a lighting controller 310 that controls lighting of a head lamp FL, an airbag system 311, a sound system 312, and an air conditioner 320.

[In-Vehicle Equipment Controller]

An in-vehicle equipment controller 100 is implemented in one or a plurality of the zone ECUs 40. That is, the in-vehicle equipment controller 100 may be implemented in all of the zone ECUs 40 or some of the zone ECUs 40. In addition, the in-vehicle equipment controller 100 (1) may be mounted in the central processing unit 10 or (2) may be mounted in a dedicated ECU (not illustrated) that is connected to a lower hierarchy of the zone ECU 40 and is provided exclusively to each of the actuators. An example of the dedicated ECU is an engine driving ECU for driving the engine. The central processing unit 10 and the ECUs may each be constructed of a single integrated circuit (IC) or may each be constructed of the plural ICs.

FIG. 2A is a block diagram illustrating a configuration example of the in-vehicle equipment controller 100. For example, the in-vehicle equipment controller 100 is constructed of a CPU 150 (a processor) and memory 160.

<CPU>

The CPU 150 performs various types of processing by loading and running a program 162 from the memory 160. More specifically, for example, the CPU 150 reads detection data from the sensor device 200, performs various types of arithmetic processing to implement various functions, and generates and outputs a control signal for controlling the actuator 300. The CPU 150 is an example of the control section. A specific aspect of the CPU 150 is not particularly limited. For example, functions of the CPU 150 may be implemented by a microcomputer or a system on a chip (SoC).

<<Hardware>>

As a hardware configuration, the CPU 150 includes: an arithmetic section that performs various types of the arithmetic processing according to the program stored in the memory 160; and a peripheral function unit 180. A peripheral described herein means the in-vehicle equipment 20 that is used in combination with the central processing unit 10 and/or the zone ECU 40.

The peripheral function unit 180 includes one or a plurality of peripheral function sections 181 to cause the peripheral, that is, the in-vehicle equipment 20 to function. As illustrated in FIG. 2A, examples of the peripheral function section 181 are an analog-to-digital converter 181*a* (hereinafter referred to as an ADC 181*a*), a digital input section 181*b*, a digital output section 181*c*, and a PWM control section 181*d*. As the peripheral function sections 181, one or some of the components 181*a* to 181*d* of FIG. 2A may be mounted, or another component may be included. In the following description, in the case where peripheral functions of the ADC 181*a*, the digital input section 181*b*, the digital output section 181*c*, and the PWM control section 181*d* are described without being distinguished from each other, these will simply be described as the peripheral function sections 181.

Each of the peripheral function sections 181 has plural channels. Each of the channels is configured that an input/output section (for example, a connector for I/O connection) of the in-vehicle equipment 20 can be connected thereto. FIG. 2A illustrates an example in which, as the above channels, input channels CHa1, CHa2 are provided to the ADC 181*a*, input channels CHb1, CHb2 are provided to the digital input section 181*b*, output channels CHc1, CHc2 are provided to the digital output section 181*c*, and output channels CHc1, CHc2 are provided to the PWM control section 181*d*. The number of the channels in each of the peripheral function sections 181 is not limited to two and may be three or more. In addition, both of the input and output channels may be provided to the single peripheral function section 181.

<<Software>>

The CPU 150 has, as a software configuration, the highest application layer 120, a lower middleware layer 130 than the application layer 120, and a lower basic software layer 140 than the middleware layer 130. A software structure that complies with so-called AUTOSAR may be adopted for the CPU 150. In this case, the application layer 120 corresponds to an application layer of AUTOSAR and is configured to include one or a plurality of Software Component (SWC) modules, for example. The basic software layer 140 and the middleware layer 130 correspond to Basic Software (BSW) of AUTOSAR, and the basic software layer 140 corresponds to a Microcontroller Abstraction Layer (MCAL) of AUTOSAR. The middleware layer 130 may be implemented as a Complex Driver.

In the application layer 120, an application 121 that implements functions of the in-vehicle equipment 20 is installed. An application having a well-known configuration can be adopted for the application 121. A specific example of the application 121 will be described below.

In the basic software layer 140, a device driver unit 141 is implemented to convert a command received from the application 121 into a hardware command. In the device driver unit 141, a device driver is implemented for each of the peripheral function sections 181 included in the peripheral function unit 180. As described above, in the example illustrated in FIG. 2A, the peripheral function sections 181 include the ADC 181a, the digital input section 181b, the digital output section 181c, and the PWM control section 181d. Thus, the device driver unit 141 includes an ADC driver 141a as a device driver for the ADC 181a, a DIO driver 141b as a device driver for the digital input section 181b and the digital output section 181c, and a PWM driver 141d as a device driver for the PWM control section 181d. That is, the ADC driver 141a is connected to the ADC 181a, the DIO driver 141b is connected to the digital input section 181b and the digital output section 181c, and the PWM driver 141d is connected to the PWM control section 181d.

The device driver is hardware-dependent software. In general, software (for example, an operating system and the like) that is not hardware-dependent is also installed in the basic software layer 140. However, since such software is remotely related to the disclosure of the present application, such software will not be described or illustrated in this embodiment.

In the middleware layer 130, a mapping module 133 and a physical quantity conversion module 135 are implemented. The mapping module 133 includes one or a plurality of first communication packets 131 for data exchange with the application 121 and one or a plurality of second communication packets 132 for data exchange with the device drivers.

In the example illustrated in FIG. 2A, IO_1, IO_2, . . . IO_X (X is a natural number) are provided as the first communication packet 131. As the second communication packet 132, (1) ADC_1, ADC_2, . . . ADC_L (L is a natural number) for data exchange with the ADC driver 141a, (2) DI_1, D_2, . . . DI_M (M is a natural number) and DO_1, DO_2, . . . DO_N (N is a natural number) for data exchange with the DIO driver 141b, and (3) PWM_1, PWM_2, . . . PWM_Q (Q is a natural number) for data exchange with the PWM driver 141d are provided. However, one of the first communication packet 131 and the second communication packet 132 may be a single packet.

The mapping module 133 generates a communication path between the application layer 120 and the device driver based on a mapping table 166 that is stored in the memory 160. In the mapping table 166, connection relationships between the first communication packet 131 and the second communication packet 132 are defined. More specifically, for example, in the case where the plural first communication packets 131 and the plural second communication packets 132 are available, the communication packet as a connection target is defined for each of the plural first communication packets 131 and the plural second communication packets 132. In a case of FIG. 2A, it is defined that a connection target of the communication packet IO_1 is the communication packet ADC_1, a connection target of the communication packet IO_2 is the communication packet DI_2, a connection target of the communication packet IO_2 is the communication packet DO_1, and a connection target of the communication packet IO_X is the communication packet PWM_2.

The physical quantity conversion module 135 converts physical quantity data included in data, which is generated by the mapping module 133 to be transferred through the communication path, according to a physical quantity conversion rule 167 stored in the memory 160. In the example illustrated in FIG. 2A, the physical quantity conversion module 135 converts a physical quantity of data that is transferred between the communication packet IO_1 and the communication packet ADC_1 and a physical quantity of data that is transferred between the communication packet IO_3 and the communication packet DO_1. Meanwhile, the physical quantity conversion module 135 does not convert a physical quantity of data that is transferred between the communication packet IO_2 and the communication packet DI_2 and a physical quantity of data that is transferred between the communication packet IO_X and the communication packet PWM_2. As described above, the physical quantity conversion module 135 may be arranged in one or some of the communication paths between the first communication packet 131 and the second communication packet 132. Alternatively, all the communication paths between the first communication packet 131 and the second communication packet 132 may pass through the physical quantity conversion module 135.

An application method of the physical quantity conversion module 135 is not particularly limited. For example, as illustrated in FIG. 2A, in the mapping table 166, the communication path is generated such that the first communication packet 131 is connected to the second communication packet 132 via the physical quantity conversion module 135. Then, when the communication data between the first communication packet 131 and the second communication packet 132 passes through the physical quantity conversion module 135, in the physical quantity conversion module 135, the physical quantity data that is included in the communication data is subjected to a calculation according to the physical quantity conversion rule 167. A specific connection example and a specific operation example will be described below. The above communication data includes type data on a packet length and a packet type, various types of flag data, and the like in addition to the physical quantity data.

In addition, although not specifically illustrated, the following connection relationships are established in FIG. 2A. The communication packet ADC_1 is connected to the channel CHa1 of the ADC 181a, and the communication packet ADC_2 is connected to the channel CHa2 of the ADC 181a. The communication packet DI_1 is connected to the channel CHb1 of the digital input section 181b, and the communication packet DI_2 is connected to the channel CHb2 of the digital input section 181b. The communication packet DO_1 is connected to the channel CHc1 of the digital output section 181c, and the communication packet DO_2 is connected to the channel CHc2 of the digital output section 181c. The communication packet PWM_1 is connected to the channel CHd1 of the PWM control section 181d, and the communication packet PWM_2 is connected to the channel CHd2 of the PWM control section 181d.

In the middleware layer 130, Run Time Environment (RTE) may be implemented between the application layer 120 and the mapping module 133. For example, in the RTE, the application 121 and software that is installed in the basic software layer 140 are abstracted and connected to each other. In this case, the first communication packet 131 is used for the data exchange between the RTE and the mapping module 133.

<Memory>

The memory 160 includes, as a storage area: a code area 161 in which the program 162 for operating the CPU 150 is stored; and a rewritable data area 165 in which data such as processing results by the CPU 150, the mapping table 166, and the physical quantity conversion rule 167 is stored. For example, in a design stage of the in-vehicle equipment controller 100, the program 162 that is created in advance is compiled and implemented in the code area 161. As described above, data for specifying the connection relationships between the first communication packet 131 and the second communication packet 132 is stored in the mapping table 166. In the physical quantity conversion rule 167, conversion rules (for example, arithmetic expressions) for the physical quantity data that is included in the data generated by the middleware layer 130 and transferred through the communication path are stored. The memory 160 is an example of the storage section.

[Operation Example of in-Vehicle Equipment Controller]

Next, a description will be made on exemplary operation of the in-vehicle equipment controller 100 with reference to FIG. 2A and FIG. 2B. A description will herein be made on the assumption that the in-vehicle equipment controller 100 is implemented in the first zone ECU 41. The sensor device 200 and the actuator 300 that are arranged in the front left zone of the vehicle 1 are mainly connected to the first zone ECU 41. As illustrated in FIG. 1, for example, the camera 201 that captures an image on a left side of the external environment, the keyless sensor 211, the PW switch 212, the door locking device 301, the electric power window device 302, the cabin temperature sensor 220, and the air conditioner 320 are connected to the first zone ECU 41.

FIG. 2A and FIG. 2B each illustrate an example of a connection state between each of the in-vehicle equipment 20 and respective one of the peripheral function sections 181.

In the case of FIG. 2A, a first cabin temperature sensor 221, the keyless sensor 211, a first air conditioner 321, and the door locking device 301 are respectively connected to the channel CHa1 of the ADC 181*a*, the channel CHb1 of the digital input section 181*b*, the channel CHc1 of the digital output section 181*c*, and the channel CHd1 of the PWM control section 181*d*. In FIG. 2A, the camera 201, the PW switch 212, and the electric power window device 302 are not illustrated. The same applies to FIG. 2B.

A case of FIG. 2B differs from the case of FIG. 2A in points that a second cabin temperature sensor 222 is connected to the channel CHa1 of the ADC 181*a* and that a second air conditioner 322 is connected to the channel CHc2 of the digital output section 181*c*. Such changes of the in-vehicle equipment 20 occur, for example, when the vehicle model or design is changed, a supplier is changed, a common program is used for models in different grades or having different body size, or the like.

It is common to the cases of FIG. 2A and FIG. 2B that, for example, reading processing of a measured temperature by the cabin temperature sensor 220 and reading processing of an input signal from the keyless sensor 211 are programmed as the program 162 in the code area 161. In addition, as the program 162, blowing air temperature and air volume adjustment processing of the air conditioner 320 according to the measured temperature by the cabin temperature sensor 220 and locking/unlocking processing of the door locking device 301 according to the input signal from the keyless sensor 211 are programmed.

Operation Example 1: Door Lock

In FIG. 2A and FIG. 2B, the application 121 packetizes a command for the reading processing of the input signal from the keyless sensor 211, and sends, as the communication packet IO_2, the packetized command to the mapping module 133. As described above, in the mapping module 133, the communication packet IO_2 is connected to the communication packet DI_2. In this way, the DIO driver 141*b* is operated based on the command from the application 121, and the reception signal of the keyless sensor 211, which is acquired by the digital input section 181*b*, is sent to the communication packet DI_2 of the middleware layer 130. The communication packet DI_2 is sent to the communication packet IO_2.

Then, when receiving the input signal from the keyless sensor 211 as the communication packet IO_2, the application 121 packetizes a command for the locking/unlocking processing of the door locking device 301 based on the input signal, and sends, as the communication packet IO_X, the packetized command to the mapping module 133. As described above, in the mapping module 133, the communication packet IO_X is connected to the communication packet PWM_2. In this way, the PWM driver 141*d* is operated based on the command from the application 121, and the door locking device 301 locks or unlocks the side door via the PWM control section 181*d*.

Operation Example 2: Air Conditioner

In FIG. 2A, the application 121 packetizes a command for the reading processing of the operation information from the cabin temperature sensor 220, and sends, as the communication packet IO_1, the packetized command to the mapping module 133. In the mapping module 133, the communication packet IO_1 is connected to the communication packet ADC_1. In this way, the ADC driver 141*a* is operated based on the command from the application 121, and measured temperature data from the first cabin temperature sensor 221, which is acquired by the ADC 181*a*, is sent to the communication packet ADC_1 of the middleware layer 130. The communication packet ADC_1 is sent to the physical quantity conversion module 135.

In the physical quantity conversion module 135, the conversion processing is executed based on the physical quantity conversion rule 167. For example, it is assumed that, as the physical quantity conversion rule 167, an arithmetic expression illustrated in a graph in an upper section of FIG. 3 is stored for the first cabin temperature sensor 221 in the memory 160. In such a case, in the physical quantity conversion module 135, a conversion calculation of "(D1× 2)−1" is performed for a measured temperature D1 by the cabin temperature sensor 220. A result of the conversion calculation is sent to the application 121 via the communication packet IO_2. The measured temperature D1 is an example of a physical quantity, and the above arithmetic expression is an example of a specified linear function.

When receiving the measured temperature data, which has been subjected to the conversion calculation, as the communication packet IO_2, from the physical quantity conversion module 135, the application 121 packetizes commands for a blowing air temperature and an air volume by the air conditioner 320 based on the measured temperature data, and sends, as the communication packet IO_3, the packetized commands to the mapping module 133. As described above, in the mapping module 133, the communication packet IO_3 is connected to the communication packet DO_1 via the physical quantity conversion module 135. The blowing air temperature and the air volume are examples of the physical quantity. Here, the blowing air temperature and the air volume are collectively referred to as a "blowing air control volume D2". That is, the blowing air control volume D2 is an example of the physical quantity.

In the physical quantity conversion module 135, the conversion processing is executed based on the physical quantity conversion rule 167. For example, it is assumed that, as the physical quantity conversion rule 167, an arithmetic expression of "D2/2" is stored for the blowing air control volume D2 of the first air conditioner 321 in the memory 160. In such a case, in the physical quantity conversion module 135, a conversion calculation is performed to convert the blowing air control volume D2, which is output from the application 121, into ½. A result of the conversion calculation is input to the DIO driver 141$b$ via the communication packet DO_1. As a result, the DIO driver 141$b$ is operated based on the command from the application 121, and the blowing air temperature and the air volume of the first air conditioner 321 are set via the digital output section 181$c$. The above arithmetic expression is an example of a specified linear function.

Here, it is assumed that the connection changes are made from FIG. 2A to FIG. 2B. In such a case, in this embodiment, the program 162 in the code area 161 is not changed, and the mapping table 166 and/or the physical quantity conversion rule 167 in the data area 165 is rewritten.

More specifically, in the example of FIG. 2B, first in the mapping table 166, the connection destination of the communication packet IO_3 is changed to the communication packet DO_2. As a result, in the mapping module 133, the connection destination of the communication packet IO_3 is changed to the communication packet DO_2. In addition, in the physical quantity conversion rule 167, a conversion rule CAL1 that is applied to the cabin temperature sensor 220 is changed according to a second cabin temperature sensor 222. Similarly, a conversion rule CRL2 that is applied to the air conditioner 320 is changed according to the second air conditioner 322.

When the setting(s) is completed, the following operation is performed in FIG. 2B.

More specifically, similar to the case of FIG. 2A, the application 121 packetizes a command for the reading processing of the operation information from the cabin temperature sensor 220, and sends, as the communication packet IO_1, the packetized command to the mapping module 133. The communication packet IO_1 is sent to the communication packet ADC_1. In this way, the ADC driver 141$a$ is operated based on the command from the application 121, and measured temperature data from the second cabin temperature sensor 222, which is acquired by the ADC 181$a$, is sent to the communication packet ADC_1 of the middleware layer 130. The communication packet ADC_1 is sent to the physical quantity conversion module 135.

It is assumed that, as the physical quantity conversion rule 167, an arithmetic expression illustrated in a graph in a lower section of FIG. 3 is stored for the second cabin temperature sensor 222 in the physical quantity conversion module 135. In such a case, in the physical quantity conversion module 135, a conversion calculation of "(D1/2)+2" is performed for a measurement result D2 of the second cabin temperature sensor 222. A result of the conversion calculation is sent to the application 121 via the communication packet IO_2.

Here, the physical quantity conversion rule 167 is provided to convert the data received by the application 121 into data in the same scale. More specifically, for example, as illustrated in FIG. 3, in the case where a gradient and intercepts differ between the first cabin temperature sensor 221 and the second cabin temperature sensor 222, conversion rules that correspond to characteristics of the first cabin temperature sensor 221 and the second cabin temperature sensor 222 are respectively applied to the first cabin temperature sensor 221 and the second cabin temperature sensor 222. In this way, the measured value by each of the first cabin temperature sensor 221 and the second cabin temperature sensor 222 can be provided to the application 121 after being adjusted to the scale as a reference. In other words, it is possible for the physical quantity conversion rule 167 to absorb differences in sensitivity, the characteristic, and the like among the sensor device 200 and the actuator 300, each of which has the mutually different sensitivity, characteristic, and the like. The physical quantity conversion rule 167 is not limited to the linear function. The rule may be created by using another function such as a high-order function or a trigonometric function.

When receiving the measured temperature data, which has been subjected to the conversion calculation, as the communication packet IO_2, from the physical quantity conversion module 135, the application 121 packetizes a command for the blowing air control volume D2 of the air conditioner 320 based on the measured temperature data, and sends, as the communication packet IO_3, the packetized command to the mapping module 133.

In the physical quantity conversion module 135, the conversion processing is executed based on the physical quantity conversion rule 167. For example, it is assumed that, as the physical quantity conversion rule 167, an arithmetic expression of "D2×2+2" is stored for the blowing air control volume D2 of the second air conditioner 322 in the memory 160. In such a case, in the physical quantity conversion module 135, a conversion calculation of "D2×2+2" is performed on the blowing air control volume D2, which is output from the application 121. A result of the conversion calculation is input to the DIO driver 141$b$ via the communication packet DO_1. As a result, the DIO driver 141$b$ is operated based on the command from the application 121, and the blowing air temperature and the air volume of the second air conditioner 322 are set via the digital output section 181$c$.

Comparative Example

Figure 4A:
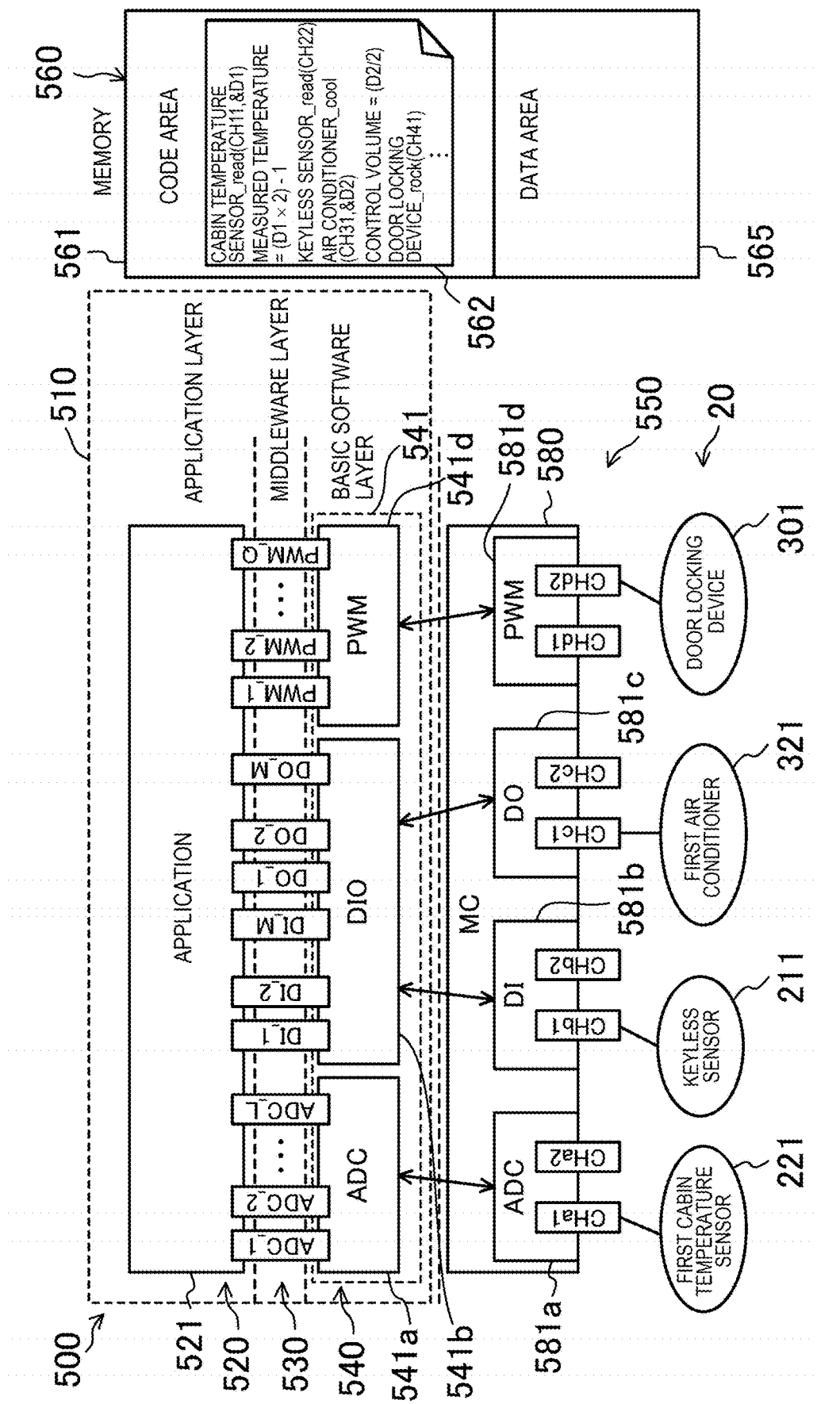
FIG. 4A is a block diagram illustrating a configuration example of an in-vehicle equipment controller according to a comparative example.

FIG. 4A and FIG. 4B each illustrate a comparative example. In FIG. 4A and FIG. 4B, a single communication packet is implemented as a middleware layer 530. In accordance with such a change, a program 562 has a different configuration. However, the rest of the configuration is the same as that in FIG. 2A and FIG. 2B. The components that are common in FIGS. 2 (2A, 2B) and FIGS. 4 (4A, 4B) will be denoted by the reference signs and numerals having the same numbers in the last two digits or having the same numbers in the last two digits and the following sign. For example, an in-vehicle equipment controller 500 corresponds to the in-vehicle equipment controller 100.

More specifically, in a code area 561, the program 562 illustrated in FIG. 4A implements processing to operate a CPU 550. Furthermore, in the program 562, connection destination channels in a peripheral function section 581 and calculations of the physical quantity when necessary are set for communication packets, each of which sends a processing content, in a middleware layer 530. With such a configuration, similar operation to that in the above embodiment is performed.

Meanwhile, in the case where a configuration illustrated in FIG. 4A is changed to a configuration illustrated in FIG. 4B, in the comparative example, the program 562 in the code area 561 has to be changed. More specifically, as indicated by underlined bold portions in the program 562 illustrated in FIG. 4B, the arithmetic expression of the measured temperature and the arithmetic expression of the control volume have to be changed.

As it has been described so far, in the in-vehicle equipment controller 100 according to this embodiment, the CPU 150 has, as the software configuration: the application layer 120 in which the application 121 is implemented; the device driver unit 141 in which the various device drivers are implemented; and the middleware layer 130 in which the communication paths between the application 121 and the device drivers are generated. The middleware layer 130 includes the physical quantity conversion module 135 for converting the physical quantity data, which is included in the data transferred through the communication path, according to the physical quantity conversion rule 167.

With such a configuration, even in the case where the characteristic of the in-vehicle equipment 20, such as the sensor device 200 or the actuator 300 connected to the peripheral function sections 181, is changed, the characteristic change of the in-vehicle equipment 20 can be handled by changing the physical quantity conversion rule 167 without changing the program in the code area 161. In the case where a small change is made to the program 162 in the code area 161, all the codes have to be complied again and rewritten in the memory 160. However, such a task is unnecessary with the configuration in this embodiment. Therefore, it is possible to significantly reduce software development man-hours.

Furthermore, in this embodiment, in the middleware layer 130, the first communication packet 131 for the data exchange with the application 121 and the second communication packet 132 for the data exchange with the device driver are provided. The memory 160 stores the rewritable mapping table 166 that specifies the connection relationships between the first communication packet 131 and the second communication packet 132. In the middleware layer 130, the communication path between the application layer 120 and the device driver unit 141 is generated based on the mapping table 166.

In this way, even in the case where the connection destination of the in-vehicle equipment 20 is desired to be changed in the peripheral function unit 180, the connection destination of the in-vehicle equipment 20 can be changed by changing the mapping table 166 without changing the program 162 in the code area 161.

The technique disclosed herein is not limited to that in the above-described embodiment and can be substituted with another technique within the scope that does not depart from the gist of the claims. The above-described embodiment is merely illustrative, and thus the scope of the present disclosure should not be interpreted in a restrictive manner. The scope of the present disclosure is defined by the claims, and all modifications and changes falling within equivalents of the claims fall within the scope of the present disclosure.

INDUSTRIAL APPLICABILITY

The technique disclosed herein is useful for design of the in-vehicle equipment controller.

What is claimed is:

1. An in-vehicle equipment controller including processing circuitry that controls in-vehicle equipment and a memory, wherein
the processing circuitry has, as a software configuration:
an application layer in which an application implementing functions for the in-vehicle equipment is installed;
a device driver that converts a command received from the application into a hardware command; and
a middleware layer in which a communication path is generated between the application and the device driver, and
the middleware layer includes a physical quantity conversion module that converts physical quantity data according to a specified conversion rule, the physical quantity data being included in data transferred through the communication path.

2. The in-vehicle equipment controller according to claim 1, wherein
the specified conversion rule is a specified linear function, and
the physical quantity conversion module performs conversion calculation of the physical quantity data by using the specified linear function.

3. The in-vehicle equipment controller according to claim 2, comprising:
a plurality of zone engine control units (ECUs), each of which is arranged per specified zone in a vehicle; and
a processor that controls the plurality of the zone ECUs, wherein
one or the plurality of the zone ECUs include the in-vehicle equipment controller according to claim 2.

4. The in-vehicle equipment controller according to claim 1, comprising:
a plurality of zone engine control units (ECUs), each of which is arranged per specified zone in a vehicle; and
a central processing unit that controls the plurality of the zone ECUs, wherein
one or the plurality of the zone ECUs include the in-vehicle equipment controller according to claim 1.

5. The in-vehicle equipment controller according to claim 1, wherein the processing circuitry is configured to
packetize the command for a reading process of operation information from a vehicle sensor,
send, as a first communication packet, the packetized command to the middleware layer, wherein in the middleware layer, the first communication packet is connected to a second communication packet, wherein the device driver is operated based on the packetized command and sensor data from the vehicle sensor is sent to the second communication packet, and
send the second communication packet to the physical quantity conversion module.

6. The in-vehicle equipment controller according to claim 5, wherein the middleware layer includes a mapping module.

7. The in-vehicle equipment controller according to claim 5, wherein the first communication packet is configured for a data exchange with the application.

8. The in-vehicle equipment controller according to claim 5, wherein the second communication packet is configured for a data exchange with the device driver.

9. The in-vehicle equipment controller according to claim 5, wherein the vehicle sensor is one or more of a cabin temperature sensor, a camera, a radar, a GPS, a vehicle state sensor, an occupant state sensor, a driving operation sensor, and a keyless sensor.

10. The in-vehicle equipment controller according to claim 1, wherein the processing circuitry is configured to
execute, at the physical quantity conversion module, conversion processing based on the specified conversion rule, wherein an arithmetic expression for a vehicle sensor is stored in the memory,
perform, in the physical quantity conversion module, a conversion calculation for a sensor measurement measured by the vehicle sensor, and
send a result of the conversion calculation to the application by a communication packet.

11. The in-vehicle equipment controller according to claim 10, wherein
the specified conversion rule is a specified linear function, and
the physical quantity conversion module performs the conversion calculation of the physical quantity data by using the specified linear function.

12. The in-vehicle equipment controller according to claim 10, wherein the communication packet is configured for a data exchange with the application.

13. The in-vehicle equipment controller according to claim 10, wherein the vehicle sensor is one or more of a cabin temperature sensor, a camera, a radar, a GPS, a vehicle state sensor, an occupant state sensor, a driving operation sensor, and a keyless sensor.

14. A method, comprising:
packetizing a command for a reading process of operation information from a vehicle sensor,
sending, as a first communication packet, the packetized command to a middleware layer, wherein in the middleware layer, the first communication packet is connected to a second communication packet, wherein a device driver is operated based on the packetized command, and sensor data from the vehicle sensor is sent to the second communication packet, and
sending the second communication packet to a physical quantity conversion module.

15. The method of claim 14, wherein the first communication packet is configured for a data exchange with an application.

16. The method of claim 14, wherein the second communication packet is configured for a data exchange with the device driver.

17. A method, comprising:
executing, at a physical quantity conversion module, conversion processing that converts physical quantity data based on a specified conversion rule, wherein an arithmetic expression for a vehicle sensor is stored in a memory of an in-vehicle equipment controller,
performing, in the physical quantity conversion module, a conversion calculation for a sensor measurement measured by the vehicle sensor, and
sending a result of the conversion calculation to an application by a communication packet.

18. The method of claim 17, wherein
the specified conversion rule is a specified linear function, and the method further comprises:
performing, at the physical quantity conversion module, the conversion calculation of the physical quantity data by using the specified linear function.

* * * * *